United States Patent
Subirada et al.

(10) Patent No.: US 7,055,925 B2
(45) Date of Patent: Jun. 6, 2006

(54) CALIBRATION AND MEASUREMENT TECHNIQUES FOR PRINTERS

(75) Inventors: Francesc Subirada, Castellbisbal (ES); David Gaston, Barcelona (ES); Oscar Ciordia, Sant Cugat del Vallès (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 32 days.

(21) Appl. No.: 10/632,011

(22) Filed: Jul. 31, 2003

(65) Prior Publication Data

US 2005/0024410 A1   Feb. 3, 2005

(51) Int. Cl.
*B41J 29/393* (2006.01)

(52) U.S. Cl. .................................................... 347/19

(58) Field of Classification Search ............... 347/3, 347/5, 14–16, 19, 32, 107, 116–117; 399/49
See application file for complete search history.

(56) References Cited

U.S. PATENT DOCUMENTS

| | | | |
|---|---|---|---|
| 4,509,057 A | 4/1985 | Sohl et al. ............... 347/19 |
| 5,796,414 A * | 8/1998 | Sievert et al. ............ 347/19 |
| 5,838,338 A | 11/1998 | Olson ...................... 347/8 |
| 6,102,509 A | 8/2000 | Olson ...................... 347/8 |
| 6,164,750 A | 12/2000 | Subirada et al. ......... 347/19 |
| 6,164,753 A * | 12/2000 | Maza et al. .............. 347/32 |
| 6,196,652 B1 | 3/2001 | Subirada et al. |
| 6,352,331 B1 | 3/2002 | Armijo et al. |
| 6,385,408 B1 * | 5/2002 | Scheuer .................. 399/49 |
| 6,390,587 B1 | 5/2002 | Subirada |
| 6,419,340 B1 * | 7/2002 | Wickham et al. ......... 347/15 |
| 6,494,558 B1 | 12/2002 | Doval et al. |
| 6,547,362 B1 | 4/2003 | Subirada et al. |
| 6,623,096 B1 | 9/2003 | Castano et al. |
| 6,648,444 B1 | 11/2003 | Valero et al. |
| 6,659,578 B1 * | 12/2003 | Gudaitis et al. .......... 347/3 |
| 6,669,322 B1 | 12/2003 | Gaston et al. |
| 6,832,824 B1 * | 12/2004 | Baker et al. ............. 347/19 |
| 6,834,928 B1 | 12/2004 | Rio Doval et al. |
| 2003/0020770 A1 | 1/2003 | Fairchild et al. ......... 347/8 |

* cited by examiner

*Primary Examiner*—Hai Pham

(57) ABSTRACT

Techniques for calibrating a scanner mounted on a scanning carriage of an image forming device. In one embodiment, a method of calibrating an optical sensor of a color image forming device includes positioning a prefabricated optical sensor target at the service area of the image forming device, the target including a plurality of target patches of predetermined different colors, moving the carriage to the service area, acquiring one or more images of the plurality of target patches, and using the one or more images to perform a plurality of calibrations of the optical sensor. In another embodiment, a method of measuring a reference position of a carriage mounted sensor array for an image forming device includes moving the carriage to a service area, generating a light beam from a carriage-mounted light source at a position adjacent an end of a sensor array, the light beam at an acute angle relative to an array axis, reflecting the beam from a reference target mounted in the service area at a known position, acquiring an image of the reflected beam by the sensor array, and using the location of a high intensity area of the image to determine the reference position of the optical sensor.

9 Claims, 8 Drawing Sheets

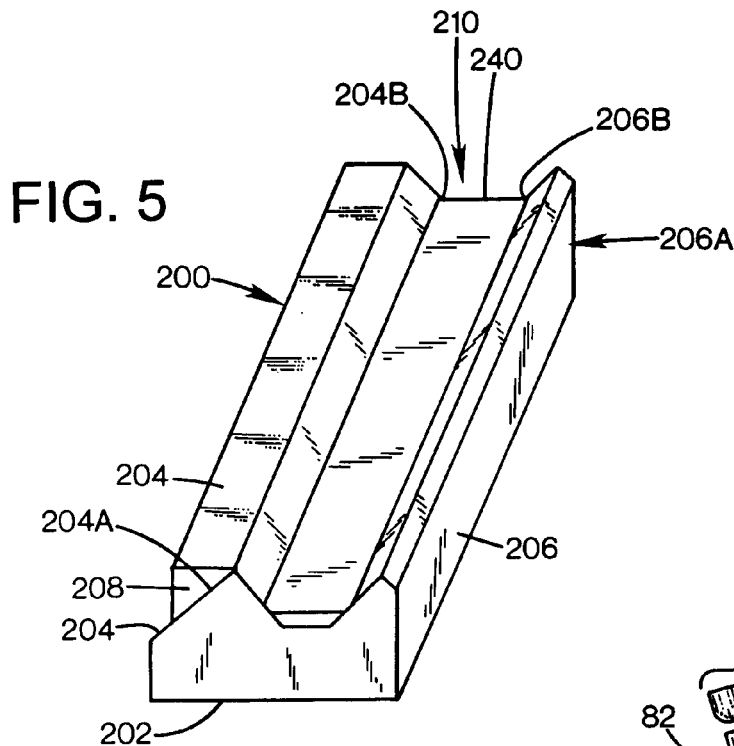
FIG. 5
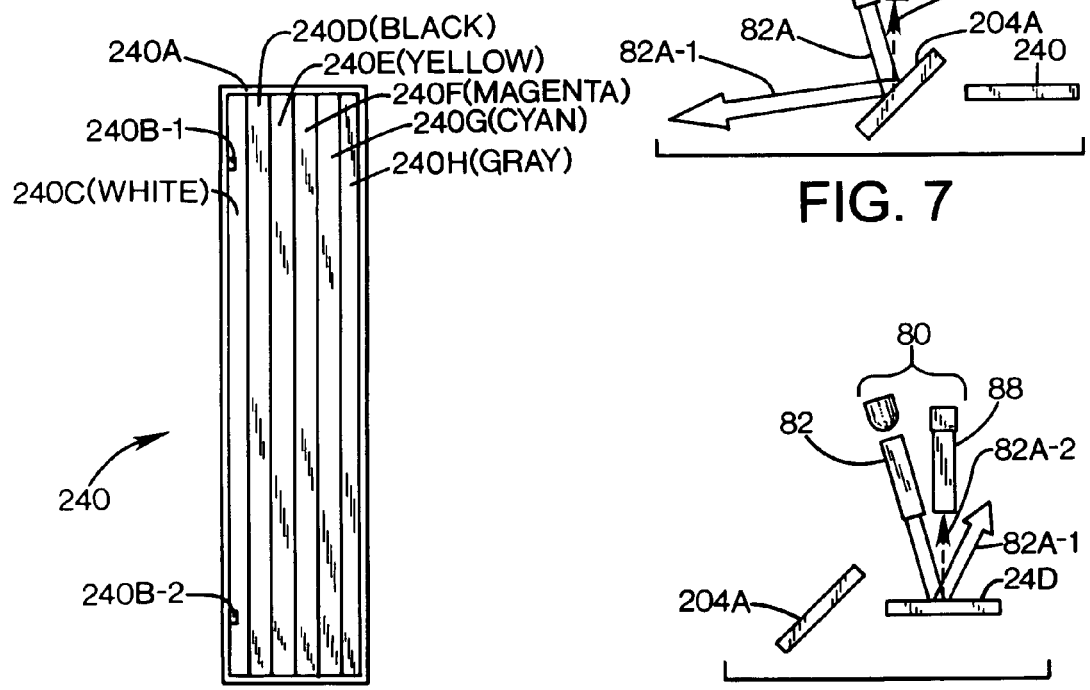
FIG. 6
FIG. 7
FIG. 8

CALIBRATION AND MEASUREMENT TECHNIQUES FOR PRINTERS

BACKGROUND OF THE DISCLOSURE

Inkjet printing mechanisms, e.g., printers, plotters, photocopiers, facsimile machines, etc., typically implement inkjet cartridges, often called "pens" to shoot drops of ink onto a sheet of print media, e.g., paper, fabric, textile, and the like. Some inkjet printing mechanisms carry an ink cartridge with an entire supply of the ink back-and-forth across the sheet. Other inkjet print mechanisms, known as "off-axis" systems, propel only a small ink supply with the printhead carriage across the print zone, and store the main ink supply in a stationary reservoir, which is located off-axis from the path of the printhead travel. Typically, a flexible conduit or tubing is used to convey the ink from the off-axis reservoir to the printhead cartridge.

Inkjet printing mechanisms typically comprise a plurality of inkjet pens of various colors. For example, a typical inkjet printer/plotter may comprise four pens, one that prints black ink, and three that print colored inks, e.g., magenta, cyan and yellow. The colors from the three color pens are typically mixed to obtain any particular color.

The pens are typically mounted in stalls within an assembly that is mounted on the carriage assembly of the printing mechanism. The carriage assembly generally positions the inkjet pens and typically holds the circuitry required for interface with components, e.g., firing resistors, piezoelectric elements, and the like, that operate the inkjet pens.

Color printing and plotting generally requires that inks from each pen be precisely applied to the print media. This requires precise alignment of the carriage assembly. However, mechanically misalignment of the pens in conventional inkjet printing mechanisms typically results in offsets in the direction of carriage travel and offsets in the direction of print media travel. This misalignment of the print carriage assembly manifests as a misregistration of the images applied by the pens. In addition, other misalignments may arise due to the speed of the carriage, the curvature of the platen and/or spray from the nozzles, and the like. Furthermore, the misalignments may arise from difficulties that may arise during the manufacture of the pens, such as imperfect nozzle shape and/or placement.

One manner in which conventional printing mechanisms attempt to overcome the problems associated with the carriage assembly misalignments is through implementation of optical systems designed to perform detections on a test strip printed by each of the pens. Printing mechanisms may include optical detectors mounted on the carriage assembly for detecting test strips printed by each of the pens. The optical detectors typically consist of one or more light emitting diodes (LED), typically of different colors, that illuminate an area or surface of the media and an optical sensor that receives the signal reflected from the media.

SUMMARY OF THE DISCLOSURE

Techniques for calibrating and using a scanner mounted on a scanning carriage of an image forming device. The scanner array can also be used for for print media border location.

BRIEF DESCRIPTION OF THE DRAWING

These and other features and advantages of the present invention will become more apparent from the following detailed description of an exemplary embodiment thereof, as illustrated in the accompanying drawings, in which:

FIG. 5 illustrates the target support structure in further detail.

FIG. 6 shows an embodiment of a calibration target which can be used with the support structure of FIG. 5.

FIG. 7 is a schematic illustration of an exemplary technique for performing a scanner sensor black calibration using the target.

FIG. 8 is a schematic illustration of an exemplary technique for performing a white/color calibration of the scanner sensor using the target.

DETAILED DESCRIPTION OF THE DISCLOSURE

For simplicity and illustrative purposes, the principles of the present invention are described by referring mainly to an exemplary embodiment thereof. In the following description, numerous specific details are set forth in order to provide a thorough understanding of the present invention. It will be apparent however, to one of ordinary skill in the art, that the present invention may be practiced without limitation to these specific details. In other instances, well known methods and structure have not been described in detail so as to not to unnecessarily obscure the present invention.

As used throughout the present disclosure, the terms "optical scanner" generally refer to a scanner module often implemented in image capturing devices. An exemplary optical scanner includes an image capturing device such as a CCD for capturing images from a print media.

Figure 1:
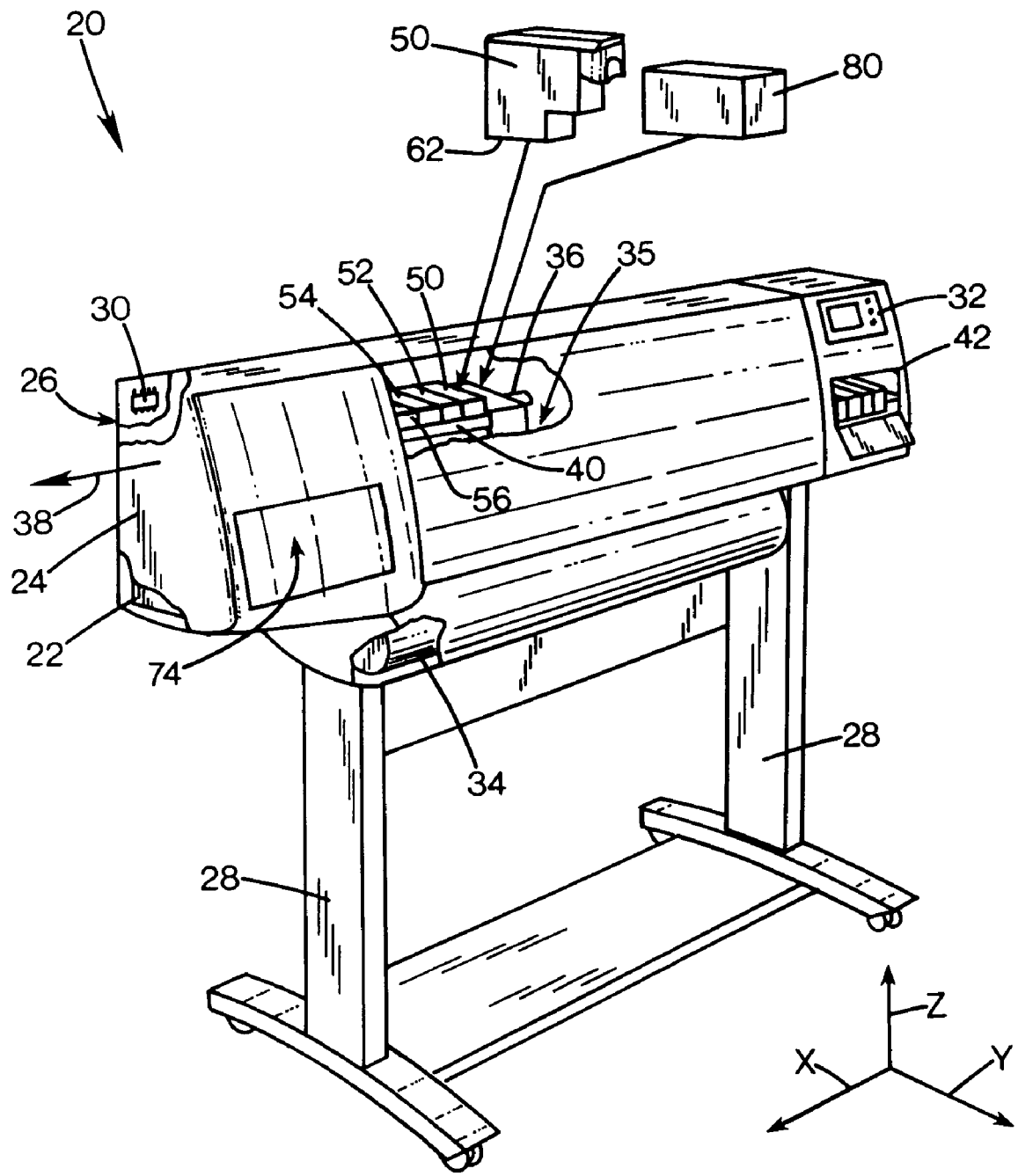
FIG. 1 illustrates an embodiment of a printer constructed in accordance with the principles of the present invention.

FIG. 1 illustrates an embodiment of a printer 20, which may be used for recording information onto a recording medium, such as paper, textiles, and the like, in an industrial, office, home or other environment. The present invention may be practiced in a variety of printers. For instance, it is contemplated that an embodiment of the present invention may be practiced in large scale textile printers, desk top printers, portable printing units, copiers, cameras, video printers, and facsimile machines, to name a few. For convenience, the concepts of the present invention are illustrated in the environment of the printer 20.

While it is apparent that the printer components may vary from model to model, the printer 20 includes a chassis 22 surrounded by a housing or casing enclosure 24, typically of a plastic material, together forming a print assembly portion 26 of the printer 20. Additionally, the print assembly portion 26 may be supported by a desk or tabletop, however, it is preferred to support the print assembly portion 26 with a pair of leg assemblies 28. The printer 20 also has a printer controller 30, illustrated schematically as a microprocessor, that receives instructions from a host device (not shown), typically a computer, such as a personal computer or a computer aided drafting (CAD) computer system. The printer controller 30 may also operate in response to user inputs provided through a key pad and a status display portion 32, located on the exterior of the casing 24. A monitor coupled to the host device may also be used to display visual information to an operator, such as the printer status or a particular program being run on the host device. Personal and drafting computers, their input devices, such as a keyboard and/or a mouse device, and monitors are all well known to those skilled in the art.

A recording media handling system (not shown) may be used to advance a continuous sheet of recording media 34 from a roll through a print zone 35. Moreover, the illustrated printer 20 may also be used for printing images on pre-cut sheets, rather than on media supplied in roll 34. The recording media may be any type of suitable sheet material, such as paper, poster board, fabric, transparencies, mylar, vinyl, and the like. A carriage guide rod 36 is mounted to the chassis 22 to define a scanning axis 38, with the guide rod 36 slideably supporting a carriage 40 for travel back and forth, reciprocally, across the print zone 35. A carriage drive motor (not shown) may be used to propel the carriage 40 in response to a control signal received from the controller 30. To provide carriage positional feedback information to controller 30, a conventional metallic encoder strip (not shown) may be extended along the length of the print zone 35 and over a servicing region 42.

An optical encoder reader may be mounted on the back surface of carriage 40 to read positional information provided by the encoder strip. The manner of providing positional feedback information via the encoder strip reader, may be accomplished in a variety of ways known to those skilled in the art.

The printer 20 of this exemplary embodiment includes four cartridges 50–56. In the print zone 35, the recording medium receives ink from cartridges 50–56. The cartridges 50–56 are also often called "pens" by those in the art. One of the pens, for example pen 56, may be configured to eject black ink onto the recording medium, where the black ink may contain a pigment-based ink. Pens 50–54 may be configured to eject variously colored inks, e.g., yellow, magenta, cyan, light cyan, light magenta, blue, green, red, to name a few. For the purposes of illustration, pens 50–54 are described as each containing a dye-based ink of the colors yellow, magenta and cyan, respectively, although it is apparent that the color pens 50–54 may also contain pigment-based inks in some implementations. It is apparent that other types of inks may also be used in the pens 50–56, such as paraffin-based inks, as well as hybrid or composite inks having both dye and pigment characteristics.

The printer 20 of this exemplary embodiment uses an "off-axis" ink delivery system, having main stationary reservoirs (not shown) for each ink (black, cyan, magenta, yellow) located in an ink supply region 74. In this respect, the term "off-axis" generally refers to a configuration where the ink supply is separated from the print heads 50–56. In this off-axis system, the pens 50–56 may be replenished by ink conveyed through a series of flexible tubes (not shown) from the main stationary reservoirs so only a small ink supply is propelled by carriage 40 across the print zone 35 which is located "off-axis" from the path of printhead travel. As used herein, the term "pen" or "cartridge" may also refer to replaceable printhead cartridges where each pen has a reservoir that carries the entire ink supply as the printhead reciprocates over the print zone.

The illustrated pens 50–56 have printheads (not shown) which selectively eject ink to form an image on a sheet of media 34 in the print zone 35. These printheads have a large print swath, for instance about 22.5 millimeters high or higher, although the concepts described herein may also be applied to smaller printheads. The printheads each have an orifice plate with a plurality of nozzles formed there through a manner well known to those skilled in the art.

The nozzles of each printhead are typically formed in at least one, but typically two linear arrays along the orifice plate (not shown). Thus, the term "linear" as used herein may be interpreted as "nearly linear" or substantially linear, and may include nozzle arrangements slightly offset from one another, for example, in a zigzag arrangement. Each linear array is typically aligned in a longitudinal direction substantially perpendicular to the scanning axis 38, with the length of each array determining the maximum image swath for a single pass of the printhead.

The printer 20 also includes an optical scanner 80 configured to scan across test patterns printed by the pens 50–56.

Figure 2:
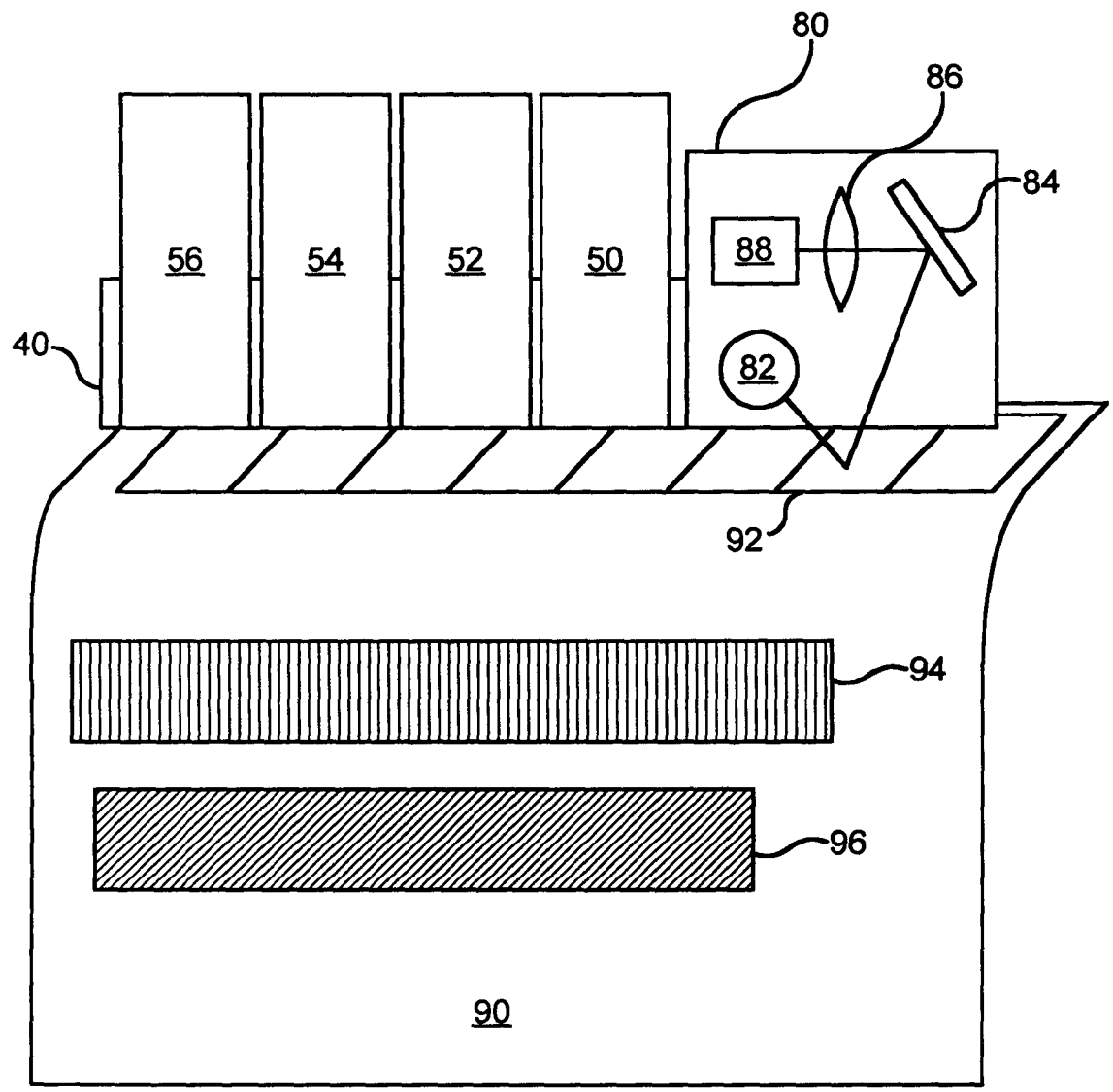
FIG. 2 is a close-up simplified cross-sectional view of the carriage portion of the printing mechanism of FIG. 1 showing the carriage-mounted optical scanner according to an embodiment of the present invention.

As best seen in FIG. 2, the printer 20 contains an optical scanner 80 connected to the carriage 40. The optical scanner 80 may be connected to the carriage 40 in any reasonably suitable manner that enables the optical scanner to scan over the print zone 35 in a manner that follows the movement of the pens 50–56 (i.e., the optical scanner is in line with the pens). Full-color printing and plotting require that the colors form the individual pens be precisely applied to the printing medium This generally requires precise alignment of the carriage assembly. Unfortunately, paper slippage, paper skew, and mechanical misalignment of the pens in conventional inkjet printing mechanisms often result in offsets along both the medium or paper-advance axis and the scan or carriage axis.

A group of test patterns 92, 94, 96 is preferably generated (by activation of selected nozzles in selected pens while the carriage scans across the print medium 90) whenever any of pens is distributed, e.g., just after a pen is replaced. The test patterns 92–96 are then read by scanning the optical scanner 80 over them and analyzing the results.

The optical scanner 80 senses the test patterns 92–96 and provides electrical signals to, for example, a processor (not shown) located on the carriage, indicative of the registration of the portions of the pattern produced by the different pens 50–56 respectively. In scanning the test patterns 92–96, the optical scanner 80 may include a field of view having a height substantially equal to the height of each of the test patterns 92–96. It is, however, envisioned that the field of view of the optical scanner 80 may be relatively greater or less than the swath height of the pens 50–56 without departing from the scope and spirit of the present invention.

In an exemplary embodiment, the optical scanner 80 may comprise a charge coupled device (CCD) scanner that is sized to fit on the carriage 40. The optical scanner 80 includes a light source 82, one or more reflective surfaces 84

(only one reflective surface is illustrated), a light focusing device 86, and a CCD 88. The optical scanner 80 captures images by illuminating the images with the light source 82 and sensing reflected light with the CCD 88. The CCD 88 may be configured to include various channels (e.g., red, green, and blue) to detect various colors using a single lamp or a one channel CCD (monochrome) with various color sources (e.g., light emitting diodes (LED)). A more detailed description of the manner in which the CCD 88 may operate to detect pixels of an image may be found in U.S. Pat. No. 6,037,584, assigned to the HEWLETT-PACKARD COMPANY. The disclosure contained in that patent is hereby incorporated by reference in its entirety.

Figure 3:
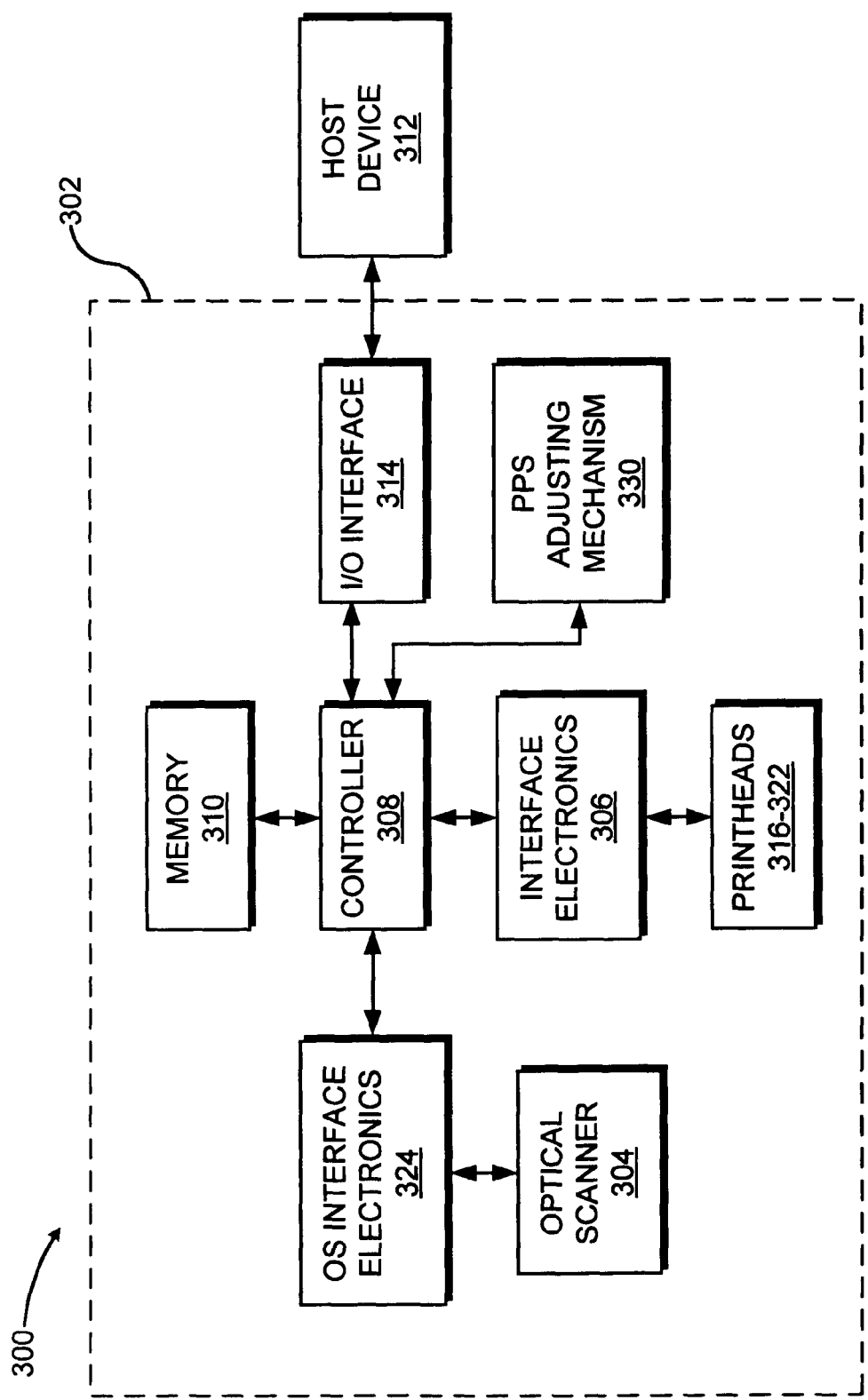
FIG. 3 is an exemplary block diagram of a printing mechanism in accordance with an embodiment of the present invention.

Referring to FIG. 3, there is illustrated an exemplary block diagram 300 of a printer 302 in accordance with an embodiment of the present invention. The following description of the block diagram 300 illustrates one manner in which a printer 302 having an optical scanner 304 may be operated in accordance with an embodiment of the present invention. In this respect, it is to be understood that the following description of FIG. 3 is but one manner of a variety of different manners in which such a printer 302 may be operated.

The printer 302 is shown as including four printheads 316–322. However, the present invention may operate with any reasonably suitable number of printheads.

The printer 302 may also include interface electronics 306 configured to provide an interface between the controller 308 and the components for moving the carriage 40, e.g., encoder, belt and pulley system (not shown), etc. The interface electronics 306 may include, for example, circuits for moving the carriage, the medium, firing individual nozzles of each printhead, and the like.

The controller 308 may be configured to provide control logic for the printer 302, which provides the functionality for the printer. In this respect, the controller 308 may be implemented by a microprocessor, a micro-controller, an application specific integrated circuit (ASIC), and the like. The controller 308 may be interfaced with a memory 310 configured to provide storage of a computer software that provides the functionality of the printer 302 and may be executed by the controller. The memory 310 may also be configured to provide a temporary storage area for data/file received by the printer 302 from a host device 312, such as a computer, server, workstation, and the like. The memory 310 may be implemented as a combination of volatile and non-volatile memory, such as dynamic random access memory ("RAM"), EEPROM, flash memory, and the like. It is, however, within the purview of the present invention that the memory 310 may be included in the host device 312.

The controller 308 may further be interfaced with an I/O interface 314 configured to provide a communication channel between the host device 312 and the printer 302. The I/O interface 312 may conform to protocols such as RS-232, parallel, small computer system interface, universal serial bus, etc.

Optical scanner interface electronics 324 may interface the optical scanner 304 and the controller 308. The optical scanner interface electronics 324 may operate to convert instruction signals from the controller 308 to the optical scanner 304. In addition, the optical scanner interface electronics 324 may also operate to convert information sensed by the optical scanner 304 into a format capable of being interpreted by the controller 308. The conversions of the instructions and the information may be accomplished by any reasonably suitable manner known to those skilled in the art.

In an exemplary embodiment, several calibrations are performed on the scanner. These calibrations include orientation angle of the scanner relative to the scan axis, pixel response uniformity and dynamic range amplification for each of the color channels. A special target is provided with several fiducials to calibrate the angle, and black/white areas to scan and calibrate the pixel response uniformity and the dynamic range.

A color reference target is also provided for the scanner sensor. An exemplary embodiment of this target includes several color patches that will be acquired by the scanner sensor to provide the same color-space reference for all the printers using the same reference target, i.e. even printers that have different inks or printheads. This is used to reduce the sensor to sensor measurement variability using a printer internal calibration procedure. Thus, the exemplary embodiment of the reference target and associated algorithms as discussed below provide sufficient information to eliminate sensor-to-sensor (and also printer-to-printer) variability and provide a common pattern to refer the same color space among printers.

A pen-to-paper spacing (PPS) measurement is also provided. The PPS measurement is made using a very focused (collimated) LED light source located at or adjacent one end of the scanner sensor. The light generated by the light source has an angle with respect to the paper (i.e. the print medium), and the sensor captures an image of the reflected light from the paper. The image includes a direct reflection image portion on the scanner sensor. The location of this direct reflection incidence on the scanner sensor, which typically can comprise a CCD array, will be proportional to the PPS measured. The target is used to provide a known PPS to calibrate the initial position on the scanner CCD array. The image of the reflected LED light also includes a diffused light portion, which can be used to detect the media type.

In one embodiment, the on-board carriage scanner is used with an appropriate light source to provide an optical drop detector. Use of the carriage sensor for optical drop-detection reduces cost and complexity.

Figure 4:
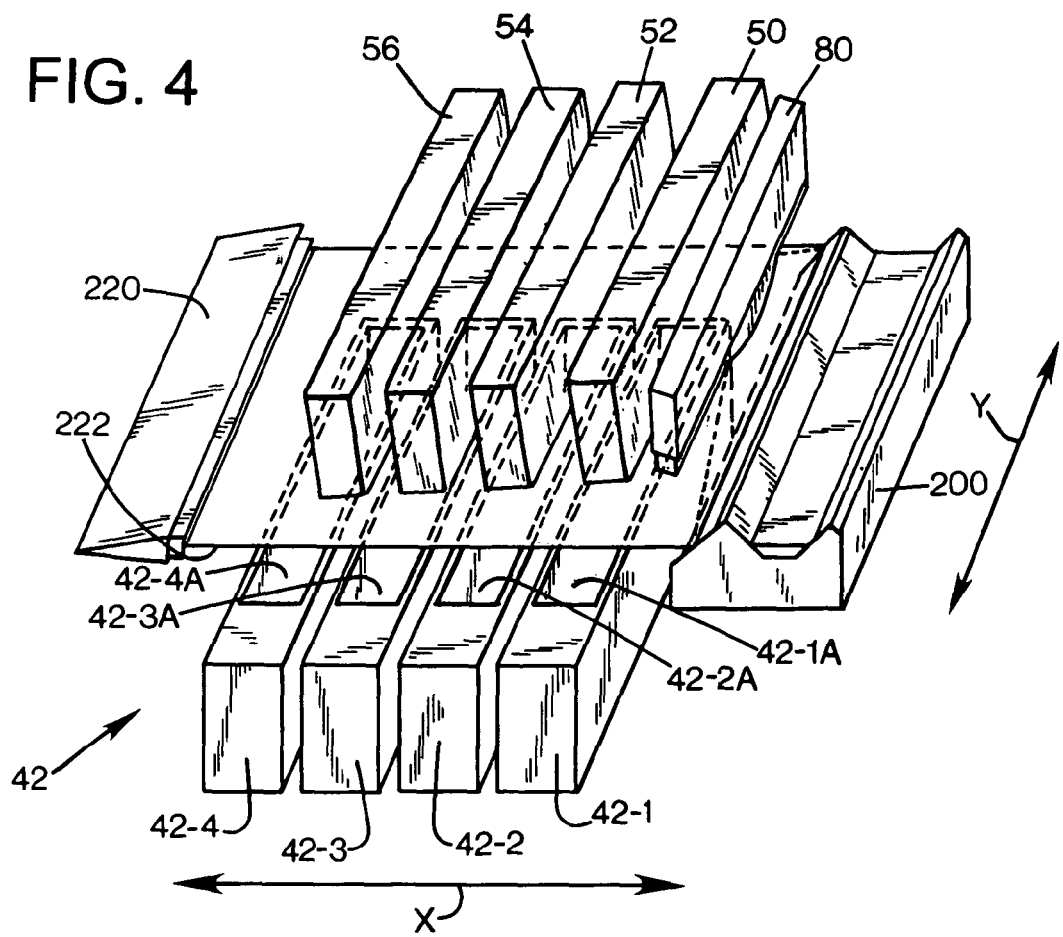
FIG. 4 illustrates an embodiment of a part of a printer, showing the printheads positioned at a service area, with a target support structure and drop detection illumination.

An exemplary embodiment of elements of a calibration and service system is shown in FIG. 4. Shown here in diagrammatic fashion are the pens 50–56 and the optical scanner 80, all carried by the carriage 40 (not shown in FIG. 4) and positioned at the service area 42. The service area 42 includes a station for servicing the pens, using printhead cleaner (PHC) assemblies 42-1, 42-2, 42-3, 42-4, i.e. one PHC for each pen. Each PHC includes a respective spittoon 42-1A, 42-2A, 42-3A, 42-4A, for receiving ink droplets spit into it by the corresponding pen during a service routine, as is well known in the art. Each PHC may also include other service elements such as a nozzle plate wiper (not shown) and a cap (not shown) for capping the pen nozzle array during periods of non-use. The service elements are mounted on a service support structure (not shown).

This embodiment of the service station area 42 also includes a multi-use module (MUM) 200 disposed on one side of the area 42, and a drop detection illumination source 220 on the opposite side of the area 42. The carriage is driven along dimension X, from the print zone to the service area 42. In this embodiment, the service components including PHCs 42-1 to 42-4, the MUM 200 and the light source 220 are stationary with respect to the X axis, although for some applications, the service components may be translated along a direction transverse to the X axis to move the MUM 200 under a cover, provide wiping motion of wiper blades on the PHCs, or for other reasons.

An exemplary embodiment of the MUM 200 is shown in further detail in FIG. 5. In this exemplary embodiment, structure 200 is an injection molded part with a relatively small footprint for the base 202. The structure has upright inclined side walls 204, 206 spaced apart on opposite sides of a flat channel 210. The side wall 204 is at an angle from the base surface 202. A mirror surface 204A is formed on side wall 204, which can in one exemplary embodiment comprise a surface of a right angle prism 208. The side wall 206 is perpendicular to the base 202. The support structure has a length L which matches a length dimension of the sensor, in this exemplary embodiment, 3.6 inches, which matches the length of the scanner field of view. A target 240 can be positioned as shown in FIG. 5, on the flat channel surface 210.

The MUM 200 in an exemplary embodiment is fabricated of a plastic material (not necessarily clear or translucent). The mirror/prism 208 is fabricated from a transparent material. The inclination of mirror surface 204A is set in order to send a drop detection light beam 222 generated by source 220 to the scanner (as seen in FIG. 4). The light beam passes under the pens to make the drop detection, so to use the carriage scanner CCD to detect that light, the beam is deflected ~90 degrees in an exemplary embodiment (the actual angle will depend on the mechanical layout for the different elements).

FIG. 6 illustrates an exemplary form of the target 240. In an exemplary embodiment, three optical reference targets, i.e. scanner calibration, color and PPS, have been integrated into a single target 240 that is positioned on the MUM 200 under the scanner module 80, as shown in FIG. 5, when the carriage is positioned at the service area 42. This embodiment of the target is a scanner/color calibration label, affixed to the MUM 200 as illustrated in FIG. 5. The label 240 is adhesively attached to the MUM, and does not have glass covering it, in this exemplary embodiment.

In an exemplary embodiment, the target has a width of 20 mm, and a length of 100 mm, although the size may depend on the sensor dimensions. A black border 240A 3 mm in width is formed about the peripheral four sides of the target. A series of elongated color bands 240C–240H are formed on the target, each of equal width, 3 mm in this exemplary embodiment. The particular colors of the bands will depend on the ink colors used in the particular printer. For one exemplary embodiment, the colors are Pantone process. Band 240C is white, band 240D is black (Pantone 325-1), band 240E is yellow (Pantone 1-3), band 240F is magenta (Pantone 148-1), band 240G is cyan (Pantone 232-1), and band 240H is gray (Pantone 325-5). A set of black fiducial marks 240B-1 and 240B-2 are formed along one elongated side of the target, 1 mm square and spaced apart by 85 mm in this exemplary embodiment. The target is a prefabricated target, which in an exemplary embodiment is printed using an offset printing process, which very accurately reproduces color and dimensions of the desired target.

The scanner 80 in this exemplary embodiment is a color device with a CCFL lamp 82 and CCD image acquisition device 88. The scanner suffers from different 'defects' in terms of the quality of the acquired image. To compensate for these defects and reduce the scanner-to-scanner variability, several calibrations using the target are performed. FIGS. 7 and 8 diagrammatically illustrate how the black calibration and white/color calibrations for the sensor 80 are performed, using the MUM 200 with the target 240. For the black sensor calibration, the carriage 40 is positioned so that the sensor 80 is positioned so that the light beam 82A emitted by the sensor lamp 82 is directed onto the reflective surface 204A and away from the light sensitive element 88 of the sensor as reflected component 82A-1. In this state the intensity of the reflected component 82A-2 which is directed back into the light sensitive element 88 for image acquisition is very small. This position allows the black state of the pixels of the sensor 88 to be read to establish noise and background light levels.

FIG. 8 shows the relative positioning of the carriage mounted sensor 80 for white/color calibrations, so that the sensor light beam 82A is directed onto the surface of the target 240, generating a reflected beam component 82A-1, with reflected beam component 82A-2. In this case, for color calibration, the carriage is incrementally positioned at different positions over the target 240 to acquire respective images of the different color bands 240C–240H of the target. The diffuse reflected component 82A-2 is employed for calibration in this exemplary embodiment, although other applications could alternatively employ the specular reflected component 82A-1.

The following calibrations are performed, in an exemplary embodiment.

a. PRNU (Pixel Response Non-Uniformity). Each pixel of the CCD sensor 88 has a slightly different sensitivity to light. The white band 240C of the label 240 is used to calibrate the sensor, with the MUM 200 positioned as shown in FIG. 8 to illuminate the white band 240C.

b. The R, G, B channels of the CCD sensor 88 have different sensitivity. When sensing white light, all three color channels should give the same value. The colors in the label (including white) are used to calibrate the R, G. B channels, with the MUM 200 positioned as shown in FIG. 8.

c. CCFL lamp 82 warm-up effects. Reflected energy from the white color band 240C is used to control the lamp with the MUM 200 positioned as shown in FIG. 8. The system provides a signal used to control the power delivered to the lamp 82, up to certain limits. The reflection from the white band 240C provides the maximum amount of light the scanner will be capable of receiving. The printer controller can chose to lower or raise the power delivered to the lamp to optimize the ratio of power delivered to the lamp versus the amount of light reaching the scanner sensor.

d. Scanner to Scanner Color variability. Identical color targets 240 are contemplated for use with different printers, so that each color strip will be exactly the same for each calibration target used for the different machines. This provides the same color reference for each machine. Thus, the same color strip is measured differently by different scanners, due to variabilities in the light source and the sensor. The colors in the target (including white) are used to compensate for these variabilities, with the MUM positioned as shown in FIG. 8. Thus, these variabilities from a known nominal scanner are used to mathematically compensate for these errors.

e. Mechanical Scanner Positioning. The targetfiducials 240-B1, 240-B2 are used to measure the position of the scanner, with the MUM positioned as shown in FIG. 8. To find the scanner location relative to the target 240, the system scans and locates a reference feature (marks 240B-1, 240B-2) in the white strip feature 240C. In this embodiment, a black reference square (240B-1) in the white region 240C locates the X axis position for the target origin or home position near one end of the linear sensor array 88. The black reference square is surrounded on three sides by a white background, i.e. areas of the white strip 240C. A small scan, e.g. 5 mm, is done, centered on the nominal location of the black square 240B-1, by moving the carriage and scanner in the X direction, right to left in the orientation of FIGS. 6 and 8. The scan results are analyzed internally by a firmware pattern matching algorithm. The algorithm performs a convolution at each pixel location to find a strong signal where the scanned data best aligns with the pattern to be located. In an exemplary embodiment, the pattern is a 1×1 mm black square surrounded by white on its top and both sides, and black on its bottom side. In an exemplary embodiment, with each pixel of the scan data having a value of either 0 (black) or 1 (white):

convolution score=summation {scan_data($l$)*pattern ($j$)}

The location producing the highest convolution score reflects the best match between the expected pattern and the scanned data. In addition, the best convolution score must be greater that some predetermined value, say 20 as an example, in order to be considered valid. If the score is too low, the scanned area probably does not contain the geometric feature sought, and so the search continues. If the score is valid then the algorithm searches for the second feature 240B-2 near the other end of the sensor line of sight. If it is not valid, the search will be repeated.

Once valid convolution scores have been obtained for both features, the search for the features enters a more precise measurement stage. At this point, the search has located the area in which a black to white transition has occurred, and the scanner will more precisely locate the reference marks to establish an accurate coordinate system for the scanner. This scan is done in an exemplary embodiment at a relatively low X axis scan resolution, e.g. 150 dpi, to maximize the size of the scanned area. The scan is looking for black/don't care/white transitions, so the black to white transition, where the reference marks are located, may actually be located somewhere between the black location and the white location. The "don't care" region accommodates skew in the scanner or target label. The scan is done with Y axis resolution (sensor array resolution)=600 dpi in an exemplary embodiment, ow at the highest optical resolution of the scanner. Because of magnification error, the distance measured in scanned pixels may be more or less than the known distance between the two marks 240B-1, 240B-2, and so a wider search is used to be sure the second mark is in the scan field of view. In addition to the origin reference mark 240B-1, the second reference mark 240B-2 located on the other side of the sensor array 88 is an object of the scan. The sensed locations of these two marks allow magnification and skew to be calculated. The marks in an exemplary embodiment are nominally 3.8 inches apart, so by determining how many pixels are scanned between the marks and at what y positions the marks are found, the magnification effect or factor of the lenses in the scanner and the label/scanner orientation can be calculated.

The system software algorithms can use the calculated magnification factor and skew angle when scanning to enlarge/reduce the image to its actual size and angle, not as seen by the scanner. The offset and skew of target 240 relative to the scanner can also be measured, by scanning over an area expected to contain the black-to-white transition between the black strip 240D and the white strip 240C. Since the dimensions of the strips and their location relative to the marks 240B-1, 240B-2 are known, the scan is conducted from a first position along the carriage motion (X) axis to a second position along the axis. The relatively long transition between a black area and a white area is sensed. An angle of the black/white transition is calculated, e.g., using a simple algorithm that approximates the transition to a line, and from the transition angle and the sensed transition, the offset of the transition from a nominal position along the X axis as well as its slope can be calculated.

f. Black Level. The scanner 80 needs to know what is the signal for each pixel with no light (i.e. the darkest black). The black label band 240D, the gray band 240H (FIG. 9), and finally the mirror/prism 208 (FIG. 8) are used to reflect all the scanner CCFL light generated by the scanner output and then see the residual signal on the CCD sensor 88. The gray band is used for color calibration, the white provides the maximum level of the sensor, and black the minimum level of the scanner. In an exemplary embodiment, using a RGB three color scanner, the reflection from the gray band provides the ratios between the red, green and blue scanner channels to achieve a neutral gray.

Figure 9:
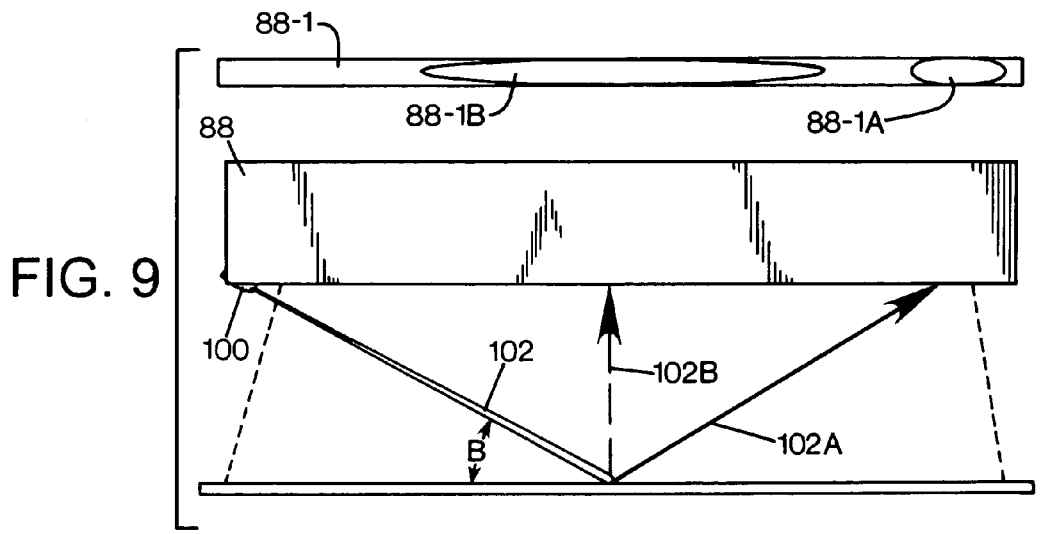
FIG. 9 diagrammatically depicts an exemplary embodiment of an arrangement for performing a PPS measurement in accordance with an aspect of the invention.

FIG. 9 schematically illustrates an exemplary arrangement of the scanner 88 and a PPS and media marker light source 100 mounted on the scanner module 80 or on the carriage 40 to which the scanner 80 is mounted, adjacent one end of the CCD array 88. The light source 100 in an exemplary embodiment is an LED, which provides a highly concentrated and focused marker LED light beam 102. The beam 102 has an angle B with respect to the print medium or target to provide a direct reflection component 102A of the beam onto the scanner sensor 88, and the sensor captures an image 88-1 of the reflected light from the print medium or target. The image includes a direct reflection image portion 88-1A. The location of this direct reflection incidence on the scanner sensor, in this exemplary embodiment a CCD array, will be proportional to the PPS measured. The target 240 is used to provide a known PPS to calibrate the initial position on the scanner CCD array, i.e. the initial Z-axis position of the CCD array. This initial position is a reference position for the sensor, with the position being measured with the carriage over the service area.

Still referring to FIG. 9, the reflected light from the target or print medium also includes a diffused light component 102B. The image of the diffused light portion, 88-1B, can be used to detect the media type. The location of this incidence on the scanner CCD 88 will be proportional to the PPS measured. The target 240 is used to provide a known PPS to calibrate the initial position on the scanner sensor array. The specular measurement, i.e. the location of image portion 88-1A, determines the relative surface properties of the media, i.e. its glossiness. A diffuse-to-specular (D/S) ratio of the diffuse signal (102B) to the specular (102A) signal can be used to sense the media type. A glossy media such as a photo paper has a larger specular signal, and hence a lower D/S ratio, than a plain paper. The D/S ratio is the ratio between the specular and diffuse channels. The CCD provides a signal for each pixel that is proportional to the light it receives. For example, assume pixel values between 255 as a "black" pixel value (no light) and 0 as a white pixel value (saturation value). In this case, for each pixel there are 256 possible values for D and S, depending on how reflective and diffuse the surface of the media is. Diffuse and specular signals will be provided by different pixels of the CCD as shown in FIG. 9, where the D signal (102B) strikes the CCD in a different place than the S signal (102A). The pixels in the diffuse signal area are averaged to provide an average signal value which is used as the D value for the D/S ratio. Similarly, the pixels in the specular signal area are averaged to provide an average signal value which is used as the S value in the D/S ratio.

Figure 10A:
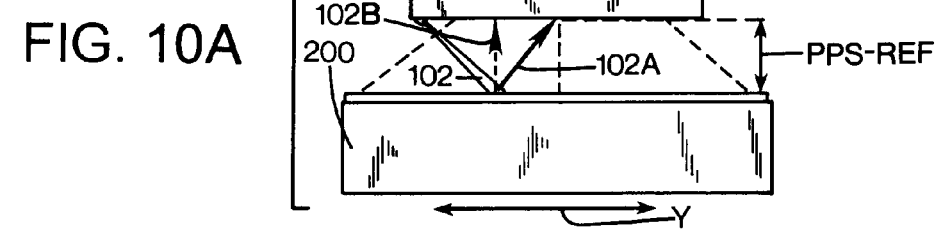
FIGS. 10A–10C illustrate use of the embodiment of FIG. 9 to adjust the PPS to a calibrated value.
Figure 10B:
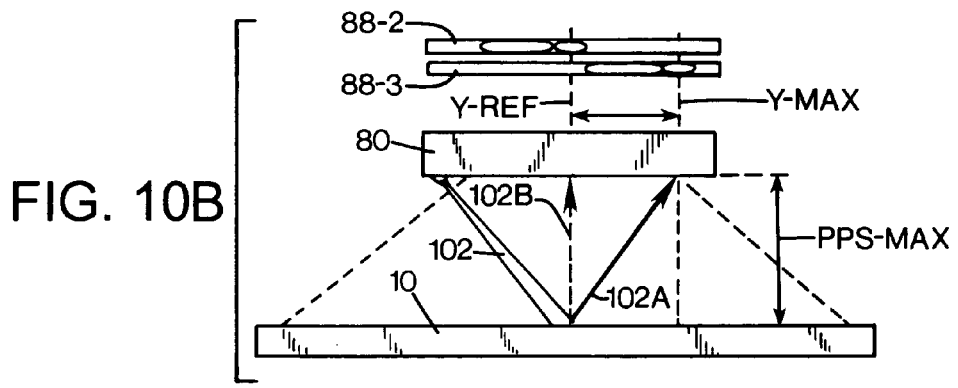
Figure 10C:
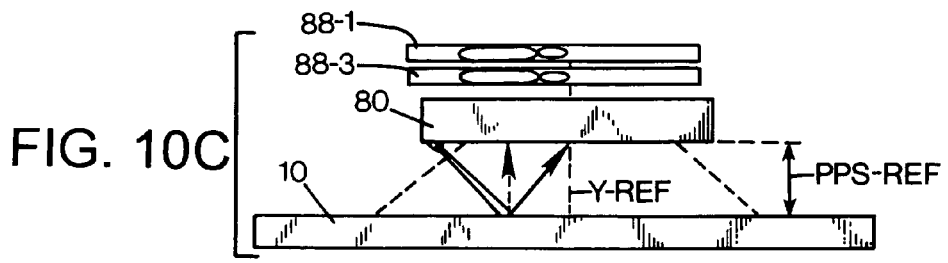

An exemplary technique for using the target 200 to calibrate the PPS is illustrated in FIGS. 10A–10C. Here the support structure 200 with the target 240 is used to provide a PPS reference, with the scanner array positioned to direct light onto the white band of the target. A mechanism 340 (FIG. 3) is provided to provide relative motion between the carriage holding the print cartridges and the print medium. The mechanism provides an adjustment means to mechanically adjust the PPS. Systems suitable for the purpose of providing this motion between the carriage and print medium are described, e.g., in U.S. 2003/0020770 A1, U.S. U.S. Pat. No. 5,838,338, and U.S. Pat. No. 6,102,509. At FIG. 10A, the print carriage 40 carrying the sensor 80 is moved to a position over the structure 200 with the mechanism at a nominal position. PPS reference position. The marker LED 100 is activated, and the location of the reflected beam 102B on the CCD array, Y-REF, is stored as indicating a nominal PPS value (PPS-REF).

Once the nominal PPS value has been measured, the PPS mechanism is moved to the maximum PPS position to load the print medium 10. The location of the LED beam 102 point of incidence on the medium and hence the acquired image of this point moves proportionally to the PPS maximum value, PPS-MAX. Thus, with the maximum PPS, the location of the acquired image on the CCD array shifts from Y-REF (FIG. 10A) to PPS-MAX (FIG. 10B) as the PPS is increased to its maximum.

To adjust the PPS to the calibrated, nominal PPS value (PPS-REF) measured in FIG. 10A, relative to the medium 10, the PPS mechanism is moved to lower the carriage 40 until the LED beam point of incidence and hence the acquired image of this point moves to Y-REF. At this state, the PPS is at the reference position.

Figure 11:
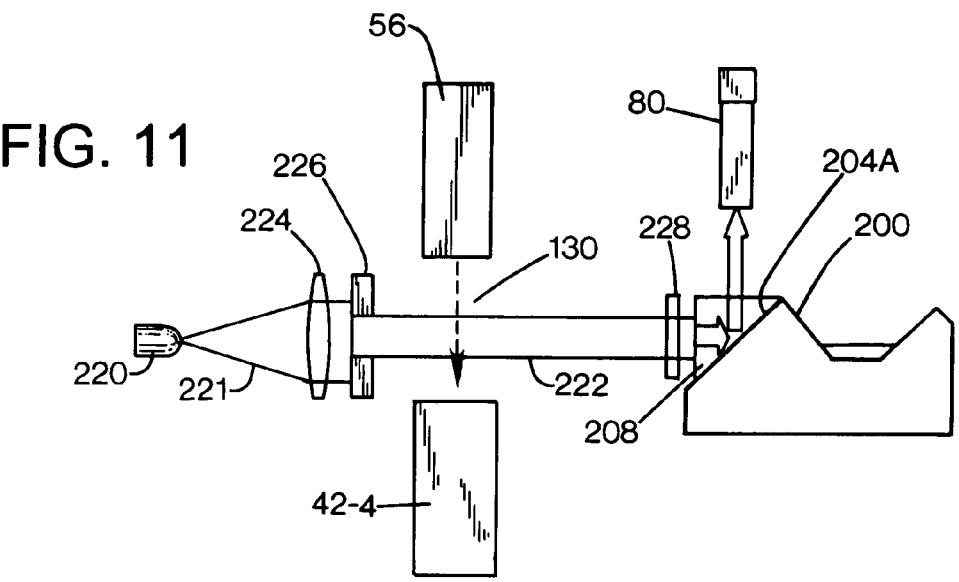
FIG. 11 is a schematic diagram of an exemplary embodiment of a system for detecting ink drops emitted by a printer printhead.

FIG. 11 is a schematic illustration of an exemplary embodiment of a drop detection system using the scanner 80 and the MUM 200, showing only the pen 56 positioned over its corresponding PHC 42-4; the other pens and PHCs are omitted from this view for simplicity. The system includes the light source 220, e.g. an array of infrared or red LEDs to emit a high intensity light plane 221, which is passed through a lens 224 and a slit in a diaphragm 226 to create a collimated light plane 222. The light plane 222 has a relatively broad spectrum, preferably not a laser light source with very narrow spectrum to avoid diffraction effects. The light plane 222 passes through a zone through which ink drops 130 emitted by the nozzle array of the pen passes when positioned over the PHC 42-4, and is incident on a diffuser 228 in front of the right-angle prism 208 of the structure 200. The prism reflects the incident light onto the scanner 80. The diffusor 228 diffuses the light from below the pens and projects the light onto the top surface for acquisition by the scanner sensor. The diffuser is an optical part that scatters the incident light when passing through it. It acts as a filter to remove the light structure and provide diffuse illumination at a controlled angle. The diffuser acts as a screen to project the beam and make it easier to image with the scanner, as it opens the span of rays incident on the scanner, and also relaxes the mechanical tolerances. Diffuser structures such as projector screens are suitable for the purpose.

The number of LEDs used in an array disposition (may be a linear array or not) for the light source 220 will depend on a different number of factors, e.g. distance to scanner, scanner sensitivity, collimation efficiency, and the like. The source 220 generates a high intensity light plane through which the nozzles of the pens are firing, the scanner is able to see more that one single nozzle 'shadow' on the CCD. For example, for a 3.6 inch long scanner setup with a 600 dpi scanner, the pen having 8448 nozzles at 2400 dpi and separating the different nozzles approximately 4 pixels:

8448 nozzles*(600 $dpi$/2400 $dpi$)*(1 nozzle/4 pixels)
=528 parallel drop detections.

Another feature is to measure the positions of the media lateral edges using the carriage scanner 80. Typically, for an exemplary CCD sensor array, the response is relatively slow, e.g. several milliseconds. To allow a border measurement while printing, e.g. with the carriage moving at a rate in a range between say 24 inches per second to 80 inches per second, some special techniques are applied. The imaging sensor 88 of the scanner is placed at an angle with respect to the paper axis Y. This allows the sensor to sense the border several times, i.e. at least twice, using the sensor with its relatively slow acquisition times. The border is detected by analyzing the CCD images. When a print media is not present within the field of view of the CCD, almost "black" values are present. When the CCD is over the print media, almost "white" values are present. The printer controller can find the media edge by looking for the black-white transition.

Figure 12:
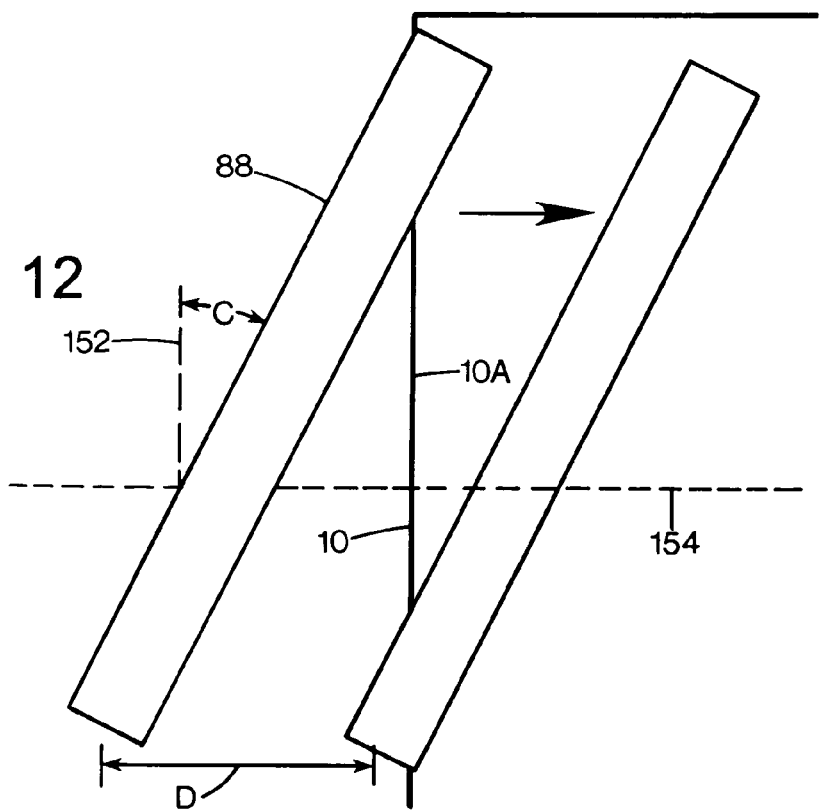
FIG. 12 schematically illustrates an embodiment of a technique for performing media edge measurements using the printer carriage scanner.

This technique is shown in FIG. 12. The sensor 88 is mounted at an angle C from the vertical, i.e. at an angle C from the direction (Y) of paper advancement 152, or 90°-C. from the carriage scan axis (X) 154. The sensor in this embodiment is a CCD array having a nominal length of 3.6 inches, with 5400 pixels. With an angle C of about 3°, an overlap distance D of about 0.2 inches is provided. With a maximum carriage speed (Vc) of 80 inches per second, assuming a 50% margin and a scanner acquisition time of 1.5 ms, this will insure that the border 10A of the media will be seen twice for each image acquisition. Two exemplary image locations are depicted in FIG. 12. The angle C is nominally 3°, i.e. nominally 87° from the scanning (X) axis, but there is some tolerance, depending on scanner length and the structures used to mount the various elements on the carriage slider rod. The actual angle is calibrated, as discussed above.

This feature in an exemplary embodiment provides a capability of measuring the media edges while printing to generate a dynamic media edge profile. The media edge profile is used to extrapolate the positions of the next swath media edges. Using the profile and extrapolated edge positions, the printer controller determines the start/stop printing positions in the scan axis for the next swath. Thus, the profile and extrapolated edge positions can be used for full-bleed printing, and allows adjusting the printing boundaries for each pass of the carriage, without printing out of the media surface. This is an improvement over prior full bleed techniques which utilized off-the-page printing and having spittoons to collect the wasted ink. These techniques allow full bleed printing without having to print on the platen, outside the media, and reduces printer dirtiness and ink waste.

Figure 13:
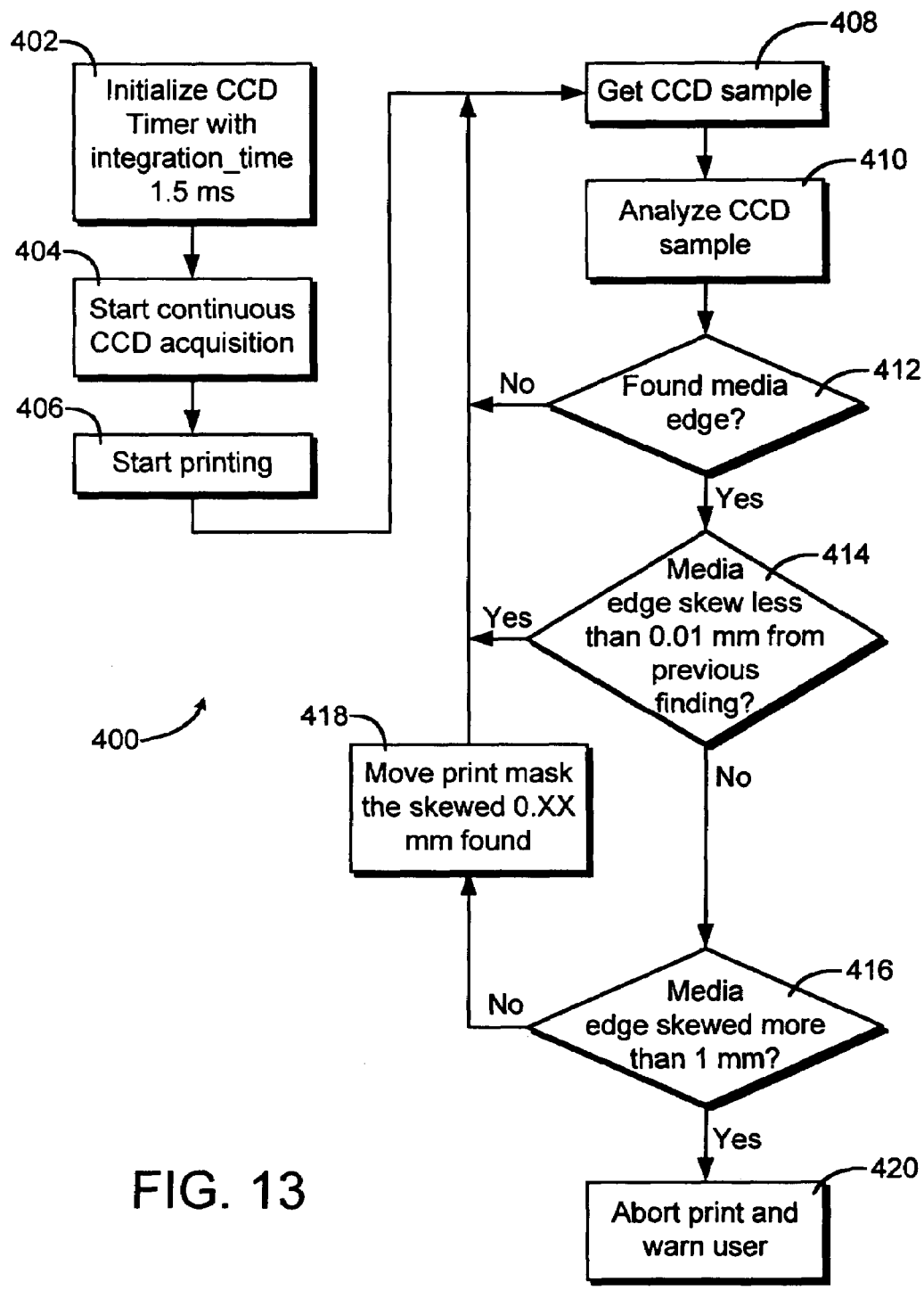
FIG. 13 is a simplified flow diagram illustrative of process steps of an exemplary method for detecting the media border.

FIG. 13 is a simplified flow diagram illustrative of process steps of an exemplary method 400 for detecting the media border in a full bleed print mode. At 402, the CCD timer is initialized with an integration time of 1.4 milliseconds. A continuous CCD acquisition mode commences at 404, and full bleed printing operations commence at 400. In an exemplary embodiment, an image is acquired every 1.5 milliseconds. A CCD sample is acquired at 408 and processed (410). If a media edge is not detected in the sample at 412, operation loops back to 408. If a media edge is found by analyzing the CCD, i.e. by a black-to-white transition, then another decision is taken at 414. The media edge position is compared to a previous media edge measurement. If the edge skew from the previous measurement is less than a predetermined low threshold, say 0.01 mm in an exemplary embodiment, operation returns to 408. If the skew is not less than the threshold, then at 416 the skew is compared to a predeter-mined high threshold, e.g. 1 mm in this example. If the skew is not greater that the high threshold, the print mask is moved the amount of the skew, to adjust the printer for the next pass of the carriage. If the skew exceeds the high threshold, then the print is aborted, and the user warned.

In an exemplary embodiment, the media edge position determining method is used to determine the position of both lateral edges of the media, i.e. the left edge as well as the right edge.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A method of calibrating an optical sensor of a color image forming device, said image loaning device including a traversing carriage supporting said optical sensor and a plurality of different color ink printheads, the traversing carriage movable over a print area during normal printing operations and over a service area of the image forming device for service operations, the method comprising:
    positioning a prefabricated optical sensor target at the service area of the image forming device, the target including a plurality of target patches of predetermined different colors, and wherein the plurality of target patches have not been produced by said plurality of different color ink printheads or said color image forming device;
    moving the carriage to the service area of the image forming device;
    acquiring one or more images of said plurality of target patches;
    using the one or more images to perform a plurality of calibrations of the optical sensor.

2. The method of claim 1, wherein said plurality of target patches includes a white patch and a black patch, and wherein said plurality of calibrations includes sensor pixel response uniformity and dynamic range.

3. The method of claim 1, wherein said plurality of target patches includes a plurality of color patches in the same respective color spectrum as each of the plurality of different color ink printheads, and said plurality of calibrations includes sensor color calibration.

4. The method of claim 1, wherein said target includes a plurality of spaced fiducial marks, and said plurality of calibrations includes determining an angular position of the target relative to the sensor.

5. The method of claim 1, wherein said optical sensor includes a linear array of photosensitive pixel elements, and wherein said plurality of target patches includes elongated strips having a longitudinal extent at least as long as a sensor field of view.

6. The method of claim 5, wherein said elongated strips include a white strip and a plurality of strips of different colors corresponding to the different color ink printheads.

7. The method of claim 1, wherein said prefabricated optical sensor target is a target printed by an offset printing process.

8. A method of measuring a reference position of a carriage mounted sensor array for an image forming device, said image forming device including a traversing carriage supporting an optical sensor and at least one printhead, the optical sensor including a sensor array having a longitudinal extent, the traversing carriage movable over a print area during normal printing operations and over a service area of the image forming device for service operations, the method comprising:
    moving the carriage to the service area;
    generating a light beam from a carriage-mounted light source at a position adjacent an end of the sensor array, the light beam at an acute angle relative to an array axis;
    reflecting the beam from a reference target mounted in the service area at a known position onto the sensor array;
    acquiring an image of the reflected beam by the sensor array; and
    using the location of a high intensity area of the image along the longitudinal extent of the sensor array to determine said reference position of the optical sensor, wherein said reference position is a reference spacing distance of the sensor array from the reference target.

9. The method of claim 8, wherein said generating a light beam from a carriage-mounted light source comprises generating a focused light beam from a light emitting diode (LED) light source.

* * * * *

UNITED STATES PATENT AND TRADEMARK OFFICE
CERTIFICATE OF CORRECTION

PATENT NO. : 7,055,925 B2
APPLICATION NO. : 10/632011
DATED : June 6, 2006
INVENTOR(S) : Francesc Subirada et al.

It is certified that error appears in the above-identified patent and that said Letters Patent is hereby corrected as shown below:

In column 13, line 21, in Claim 1, delete "loaning" and insert -- forming --, therefor.

Signed and Sealed this

Twenty-ninth Day of June, 2010

David J. Kappos
*Director of the United States Patent and Trademark Office*